United States Patent Office 3,790,668
Patented Feb. 5, 1974

3,790,668
RUMINANT FEED UTILIZATION IMPROVEMENT
Arthur P. Raun, New Palestine, Ind., assignor to Eli
Lilly and Company, Indianapolis, Ind.
No Drawing. Filed Dec. 15, 1972, Ser. No. 315,729
Int. Cl. A01k 21/00
U.S. Cl. 424—117
7 Claims

ABSTRACT OF THE DISCLOSURE

Antibiotics thiostrepton and siomycin and the physiologically-acceptable salts and complexes of thiostrepton improve the digestive efficiency of certain animals. Oral administration of the antibiotics to ruminant animals having a developed rumen function, and to animals which ferment fibrous vegetable matter in the cecum, changes the digestive fermentation of the animals to produce more propionates relative to the production of acetates.

BACKGROUND OF THE INVENTION

For many years, the animal science industry has tried to increase the efficiency of feed utilization in both ruminant and nonruminant animals. More study has been done in ruminant animals because of their greater economic importance.

In the course of investigating the efficiency of feed use, the mechanism by which ruminants digest and degrade the components of their feed to form molecules which can be metabolically utilized has been intensively studied. The mechanism of carbohydrate utilization is now well known. Microorganisms in the rumen of the animal ferment the carbohydrate to produce monosaccharides, and then degrade the monosaccharides to pyruvate compounds.

Pyruvate is then metabolized by microbiological processes to either acetate or propionate compounds, which may be either acids or other forms of the radicals. Two acetate radicals may be combined thereafter, still in the rumen, to form butyrates. Leng, "Formation and Production of Volatile Fatty Acids in the Rumen," Physiology of Digestion and Metabolism in the Ruminant (Phillipson et al. ed.), Oriel Press, pp. 408–10.

The animal can utilize butyrate, propionate, and acetate with differing degrees of efficiency. Utilization of these compounds, which are collectively known as volatile fatty acids (VFA), occurs after absorption from the gut of the animal. Butyrate is utilized most efficiently, and acetate the least efficiently. However, the relative efficiency of use of butyrate is negated by the inefficiency of the manufacture of butyrate, which must be made from acetate in the rumen.

One of the major inefficiencies in the rumen is in the manufacture of acetate. Since it is made by the degradation of a pyruvate molecule, each molecule of acetate which is produced is accompanied by a molecule of methane. Most of the methane produced is lost through eructation. Since butyrate is made from two molecules of acetate, each molecule of the relatively efficiently used butyrate involves the loss to the animal of two molecules of methane, with all of the associated energy.

Thus, the efficiency of carbohydrate utilization (carbohydrates being the major nutritive portion of ruminant animals' feed) can be increased by treatments which encourage the animal to produce propionate rather than acetate from the carbohydrates. Further, the efficiency of feed use can be effectively monitored by observing the production and concentration of propionate compounds in the rumen. If the animal is making more propionates, it will be found to be using its feed more efficiently.

The relative efficiency of utilization of the VFA's is discussed by McCullough, Feedstuffs, June 19, 1971, page 19; Eskeland et al., J. Anim. Sci. 33, 282 (1971); and Church et al., Digestive Physiology and Nutrition of Ruminants, vol. 2 (1971), pp. 622 and 625.

It has been well established that the efficiency of feed utilization by a ruminant animal can be readily determined by chemical analysis of the fermentation occurring in the rumen. For example, Marco et al., U.S. Pat. 3,293,038, taugh the use of alkylated phenols as feed additives for improved feed efficiency. They disclosed an in vitro rumen fermentation test, and in vivo animal feeding studies, which were evaluated by chemical analysis of the rumen contents for acetate and propionate.

O'Connor et al., J. Anim. Sci. 30, 812–18 (1970), reported the results of in vitro rumen fermentation tests on a large number of compounds. German Pat. 2,059,407, reported the use of a hemiacetal of chloral and starch as a feed additive which inhibits the formation of methane and produces higher than normal levels of propionic and butyric acids.

Marco et al., U.S. Pat. 3,522,353, taught the use of halogenated acyclic carboxylic acids as feed additives. It was there shown that these compounds produced in vitro increases in propionate production, and also increased feed efficiency in animals fed the compounds. To a similar effect is Erwin et al., U.S. Pat. 3,564,098.

The condition called ketosis is a manifestation of faulty VFA balance, which amounts to a clinical illness. Ruminant animals maintained on a diet which naturally degrades to a high proportion of acetate and low proportion of propionate are likely to suffer from ketosis. Dairy animals are particularly prone to the condition. Under stress, such as the onset of high lactation, too little propionate is available. As a result, more acetate is used leading to a high concentration of ketones in the body and especially in the bloodstream. A treatment for ketosis is to feed propionic acid, a precursor of propionic acid, or glucose, any one of which tends to metabolize to propionate. Clearly, if the rumen could be encouraged to produce more propionate than normal from the diet, ketosis incidence could be reduced.

SUMMARY

This invention relates to a novel method of increasing the efficiency of feed utilization by ruminant animals having a developed rumen function, and by animals which ferment fibrous vegetable matter in the cecum. An antibiotic chosen from the group thiostrepton and its physiologically-acceptable salts and complexes, and siomycin, is orally administered to the animals whose feed efficiency is to be increased.

DESCRIPTION OF THE PREFERRED EMBODIMENT

This novel method of improving feed utilization by ruminants having a developed rumen function comprises oral administration to the ruminants of an effective amount of a compound chosen from the group consisting of thiostrepton and its physiologically-acceptable complexes and salts, and siomycin.

This invention is useful particularly in ruminants which have a developed rumen function. Young ruminants, basically those still unweaned, function as monogastric animals. They use their simple liquid feeds just as monogastric animals do. As the young ruminants begin to eat solid feed, containing cellulose, starch, and other carbohydrates, the function of the rumen begins to develop, and the microbiological population of the rumen begins to build up. After the animal has eaten solid feed for a time, its rumen function reaches its full development and continues to operate throughout the animal's life.

This invention is functional in all of the ruminants, that is, the animals which have multiple stomachs, one of which is a rumen. The economically-important animals are cattle, sheep, and goats. The method is operable when the feed-utilization improving compound is fed at rates from about 0.10 mg./kg./day to about 10.0 mg./kg./day. While that range of rates is functional, the preferred range of rates is from about 0.2 to about 2 mg./kg./day.

The compounds which are disclosed herein as effective in improving the utilization of ruminants' feed are the antibiotic thiostrepton, also known as thiactin or bryamycin, and its physiologically-acceptable salts and complexes, and the antibiotic siomycin.

Donovick et al., U.S. Pat. 2,982,689, teach the description, preparation, and characteristics of thiostrepton and its salts.

Thiostrepton is a fermentation product of an organism identified as *Streptomyces azureus*, a culture of which organism is on unrestricted deposit under the identifying number 3705 in the Waksman collection at the Rutgers Institute of Microbiology, New Brunswick, New Jersey.

Platt, U.S. Patent 2,982,698, teaches an improvement in the method of preparation of thiostrepton, using *Streptomyces azureus*.

Thiostrepton is weakly basic and forms salts with strong acids such as hydrochloric and sulfuric. In addition, thiostrepton forms a complex with calcium chloride. All of the salts and the complex hydrolyze in water to yield the free base.

Siomycin is a sulfur-containing, peptide antibiotic isolated from cultures of *Streptomyces sioyaensis*, as reported by Nishimura et al., J. Antibiotics, Ser. A 15, 255–263 (1959), and consists of one major (siomycin A) and two minor (siomycin B and C) compounds, as reported by Ebata et al., J. Antibiotics, 22 (8) 364–368 (1969).

A method of producing siomycin from *Streptomyces sioyaensis* is taught by Nishimura, U.S. Pat. 3,082,153 (Mar. 19, 1963). A culture of *Streptomyces sioyaensis* is on unrestricted deposit under the identifying number ATCC 13989, with, and is available from, the American Type Culture Collection, Rockville, Maryland.

The siomycins are stable in neutral or weakly acidic solution, but not in alkaline solution. The siomycins are soluble in chloroform, dimethylformamide and dioxane, and quite insoluble in water. Ebata et al., ibid., 366 (1969).

The experimental examples which follow show that thiostrepton and siomycin are effective for increasing the efficiency of feed utilization in animals.

The effectiveness of this method of modifying the ratio of volatile fatty acids (VFA) produced in the rumen was shown by means of in vitro tests according to the procedure set forth hereinbelow.

EXAMPLE 1

Rumen fluid was obtained from a steer which has a surgically-installed fistula opening into the rumen. The steer was maintained on a high-grain ration, the composition of which follows:

| | Percent |
|---|---|
| Coarse ground corn | 69.95 |
| Ground corncobs | 10.00 |
| Soybean meal (50% protein) | 8.00 |
| Alfalfa meal | 5.00 |
| Molasses | 5.00 |
| Urea | 0.60 |
| Dicalcium phosphate | 0.50 |
| Calcium carbonate | 0.50 |
| Salt | 0.30 |
| Vitamin A and $D_2$ premix | 0.07 |
| Vitamin E premix | 0.05 |
| Trace mineral premix | 0.03 |

A sample of rumen fluid was strained through 4 layers of cheesecloth and the filtrate was collected in a vacuum bottle. The particulate matter retained by the cheesecloth was resuspended in enough physiological buffer to return it to the original volume of the rumen fluid, and the suspension was strained. The buffer used is described below:

| | G./liter |
|---|---|
| $Na_2HPO_4$ | 0.316 |
| $KH_2PO_4$ | 0.152 |
| $NaHCO_3$ | 2.260 |
| $KCl$ | 0.375 |
| $NaCl$ | 0.375 |
| $MgSO_4$ | 0.112 |
| $CaCl_2$ | 0.038 |
| $FeSO_4 \cdot 7H_2O$ | 0.008 |
| $MnSO_4$ | 0.004 |
| $ZnSO_4 \cdot 7H_2O$ | 0.004 |
| $CuSO_4 \cdot 5H_2O$ | 0.002 |
| $CoCl_2$ | 0.001 |

Cheng et al., J. Dairy Sci. 38, 1225, (1955).

The two filtrates were pooled in a separatory funnel and allowed to stand till particulate matter rose to the top. The clear layer was separated and then diluted 1:1 with the same buffer, and adjusted to pH 7.0.

Ten ml. of the diluted rumen fluid thus prepared was placed in a 25 ml. flask with 40 mg. of finely-powdered, high-grain ration, the composition of which is described above. Five mg. of soybean protein was also added per flask. The compound to be tested was weighed out and dissolved in the appropriate solvent, supra. The solution was placed on the finely-powdered ration in each test flask and dried. Four replicate flasks were used per treatment.

Two sets of four untreated control flasks each were also prepared. One set of four flasks was incubated for 16 hours at 38° C. with the test flasks. The other set of four untreated control flasks were zero-time controls, into which 2 ml. of 25 percent metaphosphoric acid was added as soon as the flasks were prepared to stop the fermentation.

Fermentation in the incubated test and control flasks was stopped at the end of 16 hours by addition of 2 ml. of 25 percent metaphosphoric acid to each flask.

All of the samples were allowed to settle, and the supernatant was analyzed by gas chromatographic methods for acetate, propionate, and butyrate.

The analysis for each volatile fatty acid (VFA) found in the zero-time controls was subtracted from the analyses of the untreated controls and of the test flasks. The resulting values reflect the amount of each VFA produced during the 16-hour fermentation period.

The data below are reported as the ratio of VFA's produced in treated flasks to VFA's produced in untreated control flasks. This method of reporting the data shows most clearly the results of the changes in the chemistry or the rumen brought about by the instant method of feed utilization improvement.

The data are means where a given test has been repeated.

| Compound | Rate, mcg./ml. | Acetate | Propionate | Butyrate |
|---|---|---|---|---|
| Thiostrepton | 10 | 0.95 | 1.48 | 0.65 |
| | 2 | 0.89 | 1.61 | 0.63 |
| | 1 | 1.00 | 1.22 | 0.81 |
| | 0.5 | 0.95 | 1.25 | 0.86 |
| | 0.25 | 0.98 | 1.09 | 0.95 |
| Siomycin | 25 | 0.84 | 1.15 | 1.05 |
| | 10 | 0.91 | 1.25 | 0.98 |
| | 2 | 0.945 | 1.19 | 0.935 |
| | 0.5 | 0.92 | 1.34 | 0.81 |

The data tabulated above shows that the antibiotics named are effective in increasing propionate production in the rumen.

Administration of the antibiotic compounds prevents and treats ketosis as well as improves feed utilization.

The causative mechanism of ketosis is a deficient production of propionate compounds. A presently recommended treatment is administration of propionic acid or feeds which preferentially produce propionates. It is obvious that the hereindisclosed method, which encourages propionate production from ordinary feeds, will reduce incidence of ketosis.

It has been found that the thiostrepton and its salts and complexes, and the siomycin used in this novel method increase the efficiency of feed utilization in ruminant animals. The easiest way to administer the antibiotics is by mxing them in the animal's feed.

However, the antibiotic compounds can be usefully administered in other ways. For example, they can be incorporated into tablets, drenches, boluses, or capsules, and dosed to the animals. Formulation of the antibiotic compounds in such dosage forms can be accomplished by means of methods well known in the veterinary pharmaceutical art. Each individual dosage unit should contain a quantity of the feed-efficiency-improving compound which has a direct relation to the proper daily dose for the animal to be treated.

Capsules are readily produced by filling gelatin capsules with any desired form of the desired antibiotic. If desired, the antibiotic can be diluted with an inert powdered diluent, such as a sugar, starch, or purified crystalline cellulose, in order to increase its volume for convenience in filling capsules.

Tablets of the antibiotics useful in this novel method are made by conventional pharmaceutical processes. Manufacture of tablets is a well-known and highly-advanced art. In addition to the active ingredient, a tablet usually contains a base, a disintegrator, an absorbent, a binder, and a lubricant. Typical bases include lactose, fine icing sugar, sodium chloride, starch and mannitol. Starch is also a good disintegrator as is alginic acid. Surface-active agents such as sodium lauryl sulfate and dioctyl sodium sulphosuccinate are also sometimes used. Commonly-used absorbents again include starch and lactose, while magnesium carbonate is also useful for oily substances. Frequently-used binders are gelatin, gums, starch, dextrin and various cellulose derivatives. Among the commonly-used lubricants are magnesium stearate, talc, paraffin wax, various metallic soaps, and polyethylene glycol.

This method of increasing the efficiency of feed utilization can also be practiced by the administration of the antibiotic compound as a slow-pay-out bolus. Such boluses are made as tablets are made except that a means to delay the dissolution of the antibiotic is provided. Boluses are made to release for lengthy periods. The slow dissolution is assisted by choosing a highly water-insoluble form of the antibiotic. A substance such as iron filings is added to raise the density of the bolus and keep it static on the bottom of the rumen.

Dissolution of the antibiotic is delayed by use of a matrix of insoluble materials in which the drug is embedded. For example, substances such as vegetable waxes, purified mineral waxes, and water-insoluble polymeric materials are useful.

Drenches of the antibiotics are prepared most easily by choosing a water-soluble form of the antibiotic. If an insoluble form is desired for some reason, a suspension may be made. Alternatively, a drench may be formulated as a solution in a physiologically-acceptable solvent such as a polyethylene glycol.

Suspensions of insoluble forms of the antibiotics can be prepared in nonsolvents such as vegetable oils such as peanut, corn, or sesame oil; in a glycol such as propylene glycol or a polyethylene glycol; or in water, depending on the form of the antibiotic chosen.

Suitable physiologically-acceptable adjuvants are necessary in order to keep the antibiotic suspended. The adjuvants can be chosen from among the thickeners, such as carboxymethylcellulose, polyvinylpyrrolidone, gelatin, and the alginates. Many classes of surfactants also will serve to suspend antibiotics. For example, lecithin, alkylphenol polyethylene oxide adducts, naphthalene sulfonates, alkylbenzenesulfonates, and the polyoxyethylene sorbitan esters are useful for making suspension in liquid nonsolvents.

In addition, many substances which affect the hydrophilicity, density, and surface tension of the liquid can assist in making suspensions in individual cases. For example, silicone antifoams, glycols, sorbitol, and sugars can be useful suspending agents.

The suspendable antibiotic may be offered to the animal grower as a suspension, or as a dry mixture of the antibiotic and adjuvants, to be diluted before use.

These antibiotics may also be administered in the drinking water of the ruminants. Incorporation into drinking water is performed by adding a water-soluble or water-suspendable form of desired antibiotic to the water in the proper amount. Formulation of the antibiotic for addition to drinking water follows the same principles as formulation of drenches.

The most practical way to treat animals with the antibiotic compounds usable in this novel method is by the formulation of the compound into the feed supply. Any type of feed may be medicated with the antibiotic compounds, including common dry feeds, liquid feeds, and pelleted feeds.

The methods of formulating drugs into animal feeds are well known. It is usual to make a concentrated drug premix as a raw material for medicated feeds. For example, typical drug premixes may contain from about 1 to about 400 g. of drug per pound of premix. The wide range results from the wide range of concentration of drug which may be desired in the final feed. Premixes may be either liquid or solid.

The formulation of ruminant feeds containing the proper amounts of the antibiotic compounds for useful treatment is mainly a matter of arithmetic. It is necessary only to calculate the amount of compound which it is desired to administer to each animal, to take into account the amount of feed per day which the animal eats, and the concentration of antibiotic compound in the premix to be used, and calculate the proper concentration of the antibiotic compound in the feed.

All of the methods of formulation, mixing, and pelleting feeds which are normally used in the ruminant feed art are entirely appropriate for manufacturing feeds containing the antibiotic compounds usable in this method.

It is not intended that the scope of this invention be limited to any particular formulations or methods of administration. The invention is a method of increasing the efficiency of feed utilization by ruminant animals by the oral administration of certain antibiotics, regardless of the method of administration of the antibiotics.

It is usual to treat economic animals, including ruminants, with a variety of growth promoters, disease-preventives, and disease treatments throughout their lives. Such drugs are often used in combination. The novel method may be practiced in combination with other treatments.

As has been shown, oral administration of thiostrepton or siomycin beneficially alters the production of propionates relative to the production of acetates in the rumen. The same treatment also benefits monogastic animals which ferment fibrous vegetable matter in the cecum. The monogastric animals here referred to are those which consume fibrous vegetable food and digest at least part of it by microbiological fermentation in the cecum. The cecal fermentation follows a chemical pathway similar to rumen fermentation.

Horses, swine, and rabbits are exemplary animals which digest a part of their food by cecal fermentation. The overall feed utilization of such animals is improved by oral administration of thiostreption or siomycin by means of a beneficial change in the propionate/acetate ratio. Horses and rabbits are exemplary of animals in which cecal fermentation is a major part of the total digestive process, and in which thiostrepton and siomycin are accordingly particularly beneficial.

I claim:

1. A method of increasing the efficiency of feed utilization by ruminant animals having a developed rumen function which comprises the oral administration to such animals of a propionate-increasing amount of an antibiotic selected from the group consisting of siomycin, thiostrepton, and the physiologically-acceptable calcium chloride complex and salts of thiostrepton.

2. The method of claim 1 wherein the ruminant animals are cattle.

3. The method of claim 1 wherein the ruminant animals are sheep.

4. The method of claim 1 wherein the antibiotic is administered at a rate of from about 0.10 mg./kg./day to about 10 mg./kg./day.

5. The method of claim 1 wherein the antibiotic is administered at a rate of from about 0.2 mg./kg./day to about 2 mg./kg./day.

6. The method of claim 4 wherein the ruminant animals are cattle.

7. The method of claim 4 wherein the ruminant animals are sheep.

References Cited

Wallace—J. of Animal Science, vol. 31, December 1970, pp. 1118–1120.

Olin Mathieson—Chem. Abst., vol. 52 (1958), pp. 19022i and 19023a.

Haruo—Chem. Abst., vol. 59 (1963), p. 2134a.

SAM ROSEN, Primary Examiner

U.S. Cl. X.R.

424—118